United States Patent
Zhang

(10) Patent No.: US 9,198,254 B2
(45) Date of Patent: Nov. 24, 2015

(54) LED BACKLIGHT DRIVING CIRCUIT AND LCD DEVICE

(71) Applicant: SHENZHEN CHINA STAR OPTOELECTRONICS TECHNOLOGY CO., LTD, Shenzhen (CN)

(72) Inventor: Xianming Zhang, Shenzhen (CN)

(*) Notice: Subject to any disclaimer, the term of this patent is extended or adjusted under 35 U.S.C. 154(b) by 254 days.

(21) Appl. No.: 13/809,431

(22) PCT Filed: Dec. 18, 2012

(86) PCT No.: PCT/CN2012/086884
§ 371 (c)(1),
(2) Date: Jan. 10, 2013

(87) PCT Pub. No.: WO2014/089855
PCT Pub. Date: Jun. 19, 2014

(65) Prior Publication Data
US 2014/0168052 A1    Jun. 19, 2014

(51) Int. Cl.
*G09G 3/36* (2006.01)
*H05B 33/08* (2006.01)
*G09G 3/34* (2006.01)

(52) U.S. Cl.
CPC .......... *H05B 33/0887* (2013.01); *G09G 3/3406* (2013.01); *G09G 3/3426* (2013.01);
(Continued)

(58) Field of Classification Search
CPC .......... G09G 3/3406; G09G 2320/064; G09G 2320/0646; G09G 2360/016; G09G 2330/021
USPC ...................................... 345/102
See application file for complete search history.

(56) References Cited

U.S. PATENT DOCUMENTS 5,615,093 A * 3/1997 Nalbant .......................... 363/25
7,852,300 B2 * 12/2010 Shteynberg et al. ............ 345/82
(Continued)

FOREIGN PATENT DOCUMENTS

CN    201393057 Y    1/2010
CN    101715265 A    5/2010
(Continued)

OTHER PUBLICATIONS

Yan Yanwan, the International Searching Authority written comments, Sep. 2013, CN.

*Primary Examiner* — Jason Mandeville

(57) ABSTRACT

A light emitting diode (LED) backlight driving circuit includes an LED lightbar, and a driver integrated circuit (IC) coupled to the LED lightbar. The driver IC is configured with a protection pin that controls the driver IC to enter a protection mode when a voltage of the protection pin exceeds a preset voltage range, an undervoltage module is coupled between a power input end of the LED lightbar and the protection pin, and an overvoltage protection module is coupled between a power output end of the LED lightbar and the protection pin. An output overvoltage protection module is coupled between the power output end of the LED lightbar and the protection pin. The input undervoltage protection module outputs a first control voltage that exceeds the preset voltage range to the protection pin when the power input end of the LED lightbar is in an undervoltage state. The output overvoltage protection module outputs a second control voltage that exceeds the preset voltage range to the protection pin when the power input end of the LED lightbar is in an overvoltage state.

3 Claims, 1 Drawing Sheet

(52) U.S. Cl.
CPC .. *G09G2320/064* (2013.01); *G09G 2320/0646* (2013.01); *G09G 2330/00* (2013.01); *G09G 2330/04* (2013.01); *Y02B 20/341* (2013.01)

(56) References Cited

U.S. PATENT DOCUMENTS

| | | | |
|---|---|---|---|
| 7,965,047 B2* | 6/2011 | Wang | 315/219 |
| 8,310,169 B2* | 11/2012 | Yu | 315/246 |
| 8,330,380 B2* | 12/2012 | Fujimura et al. | 315/200 R |
| 2002/0075699 A1* | 6/2002 | Hsu | 363/21.16 |
| 2007/0222739 A1 | 9/2007 | Yu et al. | |
| 2010/0060190 A1* | 3/2010 | Cheng | 315/291 |
| 2011/0037401 A1* | 2/2011 | Yu | 315/246 |
| 2011/0148314 A1* | 6/2011 | Lin et al. | 315/192 |

FOREIGN PATENT DOCUMENTS

| | | |
|---|---|---|
| CN | 101988934 A | 3/2011 |
| CN | 201910952 U | 7/2011 |
| CN | 202307083 U | 7/2012 |
| CN | 202353850 U | 7/2012 |

\* cited by examiner

LED BACKLIGHT DRIVING CIRCUIT AND LCD DEVICE

TECHNICAL FIELD

The present disclosure relates to the field of a liquid crystal display (LCD), and more particularly to a light emitting diode (LED) backlight driving circuit, and an LCD device.

BACKGROUND

A light emitting diodes (LED) is generally used as a backlight source in a typical liquid crystal display (LCD) device, a plurality of the LEDs are connected in series to form lightbars, and the lightbars are connected in parallel if there are two or more of the lightbars. The LED lightbar drive is controlled by a driver integrated circuit (IC). To ensure that the lightbars can safely and reliably operate, the driver IC generally has an input undervoltage protection and an output overvoltage protection function. However, in the prior art, the protection signals of the two protection schemes occupy two pins of the driver IC, which makes the driver IC not as useful when the pins are being used

SUMMARY

In view of the above-described problems, the aim of the present disclosure is to provide a light emitting diode (LED) backlight driving circuit and a liquid crystal display (LCD) device capable of reducing using pins of the driver IC.

The aim of the present disclosure is achieved by the following technical scheme.

An LED backlight driving circuit comprises an LED lightbar, and a driver integrated circuit (IC) coupled to the LED lightbar. The driver IC is configured with a protection pin that controls the driver IC to enter a protection mode when a voltage of the protection pin exceeds a preset voltage range, an input undervoltage protection module is coupled between a power input end of the LED lightbar and the protection pin, and an output overvoltage protection module is coupled between a power output end of the LED lightbar and the protection pin.

The input undervoltage protection module outputs a first control voltage that exceeds the preset voltage range to the protection pin when the power input end of the LED lightbar is in a undervoltage state, and the output overvoltage protection module outputs a second control voltage that exceeds the preset voltage range to the protection pin when the power output end of the LED lightbar is in an undervoltage state.

Furthermore, the input undervoltage protection module comprises a first controllable switch, and an undervoltage control unit coupled to a control end of the first controllable switch. The first controllable switch is connected in series between the protection pin and a power grounding end of the LED backlight driving circuit.

When the power input end of the LED lightbar is in the undervoltage state, the undervoltage control unit drives the first controllable switch to turn on, and the voltage of the power grounding end is connected to the protection pin by the first controllable switch. The first control voltage is the voltage of the power grounding end. At this moment, the protection pin is grounded, the voltage of the protection pin approximates to zero and is lower than the preset voltage range, the driver IC enters the protection mode, which avoids effectively malfunction.

Furthermore, the undervoltage control unit comprises a first resistor and a second resistor that are connected in series between the power input end of the LED lightbar and the power grounding end of the LED backlight driving circuit in sequence, a control end of the first controllable switch is coupled between the first resistor and the second resistor, and the first controllable switch is turned on at a low level. The first controllable switch is controlled by a resistor divider circuit, a voltage of the control end of the first controllable switch is a voltage of the second resistor, and the voltage of the second resistor changes linearly with the input voltage. When the input voltage is reduced, the voltage of the second resistor is reduced. When the voltage is lower than a threshold of the first controllable switch, the first controllable switch is turned on, and the protection pin is grounded. Thus, the driver IC enters the protection mode. The resistor divider has a simple circuit stricture and low resistor cost, which reduces design and production cost.

Furthermore, a first Zener diode is connected in series between the power input end of the LED lightbar and the first resistor, an anode of the first Zener diode is coupled to the first resistor, and a cathode of the first Zener diode is coupled to the power input end of the LED lightbar. The first Zener diode can prevent the input voltage ground from being short circuited when the first resistor and the second resistor are short-circuited.

Furthermore, the output overvoltage protection module comprises a first divider unit and a second divider unit that are connected in series between the power output end of the LED lightbar and the power grounding end of the LED backlight driving circuit, and the protection pin is coupled between the first divider unit and the second divider unit. When the power output end of the LED lightbar in the overvoltage state, the second divider unit outputs a high voltage that exceeds the preset voltage range and is connected to the protection pin. The second control voltage is the high voltage output by the second divider unit. This is a specific output overvoltage protection module adopting a divider circuit.

Furthermore, the first divider unit comprises a third resistor and a fourth resistor that are connected in series, and the second divider unit comprises a fifth resistor. A sixth resistor is connected in series between the protection pin and the first divider unit and the second divider unit. This is a specific form of the resistor divider circuit.

Furthermore, an input overvoltage protection module is coupled between the power input end of the LED lightbar and the protection pin, and the input overvoltage protection module outputs a third control voltage that exceeds the preset voltage range to the protection pin when the power input end of the LED lightbar is in the overvoltage state. The protection effect of the present disclosure can be further increased by using the input overvoltage protection module.

Furthermore, the input overvoltage protection module comprises a second controllable switch, and an overvoltage control unit coupled to a control end of the second controllable switch. The second controllable switch is connected in series between the protection pin and the power grounding end of the LED backlight driving circuit.

When the power input end of the LED lightbar is in the overvoltage state, the overvoltage control unit drives the second controllable switch to turn on, and the voltage of the power grounding end is connected to the protection pin by the second controllable switch. The second control voltage is the voltage of the power grounding end. At this moment, the protection pin is grounded, the voltage approximates to zero and is lower than the preset voltage range certainly, and the driver IC enters the protection mode, which avoid effectively malfunction.

Furthermore, the overvoltage control unit comprises a second Zener diode, a seventh resistor and an eighth resistor that are connected in series between the power input end of the LED lightbar and the power grounding end of the LED backlight driving circuit in sequence, the control end of the second controllable switch is coupled between the seventh resistor and the eighth resistor, and the second controllable switch is turned on at a high level. An anode of the second Zener diode is coupled to the seventh resistor, and a cathode of the second Zener diode is coupled to the power input end of the LED lightbar. The second controllable switch is controlled by adopting a resistor divider, the voltage of the control end of the second controllable switch is a voltage of the eighth resistor, and the voltage of the eighth resistor is linearly changed with the input voltage. When the input voltage is increased, the voltage of the eighth resistor is increased. When the voltage is higher than a threshold of the second controllable switch, the second controllable switch is turned on, and the protection pin is grounded. Thus, the driver IC enters the protection mode. The resistor divider has a simple circuit and low resistor cost, which reduces design and production cost. The second Zener diode can prevent the input voltage ground short circuit when the seventh resistor and the eighth resistor are short-circuited.

An LCD device comprises the LED backlight driving circuit mentioned above.

In the present disclosure, because both the input undervoltage protection module and the output overvoltage protection module are connected to the protection pin, and the protection pin is configured with a preset voltage range for normal operation, the driver IC normally operates when the voltage of the protection pin is within the preset voltage range. If the voltage of the protection pin is lower than or greater than the preset voltage range, the driver IC enters the protection mode. So long as the input undervoltage protection module detects that the input voltage is too low, the input undervoltage protection module outputs a voltage that is lower than or greater than the preset voltage range to the protection pin, to enable the driver IC to enter the protection mode. Similarly, when the output overvoltage protection module detects that the input voltage is too high, the overvoltage protection module also outputs a voltage that is lower than or greater than the preset voltage range to the protection pin. Thus, the input in undervoltage protection module and the output overvoltage protection module can use a same protection pin, which reduces using the pins of the driver IC.

DETAILED DESCRIPTION

The present disclosure provides a liquid crystal display (LCD) device that comprises a light emitting diode (LED) backlight driving circuit. The LED backlight driving circuit comprises an LED lightbar and a driver integrated circuit (IC) coupled to the LED lightbar. The driver IC is configured with a protection pin that controls the driver IC to enter a protection mode when a voltage of the protection pin exceeds a preset voltage range. An input undervoltage protection module is coupled between a power input end of the LED lightbar and the protection pin, and an output overvoltage protection module is coupled between a power output end of the LED lightbar and the protection pin.

The input undervoltage protection module outputs a first control voltage that exceeds the preset voltage range to the protection pin when the power input end of the LED lightbar is in an undervoltage state, and the output overvoltage protection module outputs a second control voltage that exceeds the preset voltage range to the protection pin when the power output end of the LED lightbar is in the undervoltage state.

In the present disclosure, because both the input undervoltage protection module and the output overvoltage protection module are connected to the protection pin, and the protection pin is configured with a preset voltage range for normal operation, the driver IC normally operates when the voltage of the protection pin is within the preset voltage range. If the voltage of the protection pin is lower than or greater than the preset voltage range, the driver IC enters into the protection mode. So long as the input undervoltage protection module detects the input voltage is too low, the input undervoltage protection module outputs a voltage that is lower than or higher than the preset voltage range to the protection pin, to enable the driver IC to enter the protection mode. Similarly, when the output overvoltage protection module detects that the input voltage is too high, the output overvoltage protection module also outputs a voltage that is lower than or greater than the preset voltage range to the protection pin. Therefore, the input undervoltage protection module and the output overvoltage protection module can use a same protection pin, which reduces to using the pins of the driver IC. The present disclosure will further be described in detail in accordance with the figures and the preferable examples.

Figure 1:
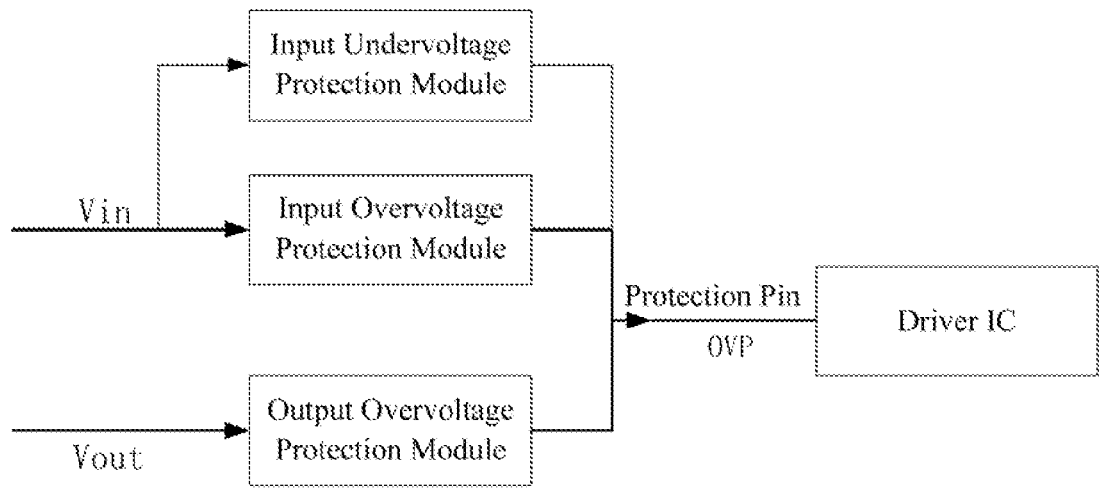
FIG. 1 is a schematic diagram of a conception of the present disclosure.

As shown in FIG. 1, an LED backlight driving circuit comprises an input undervoltage protection module, an input overvoltage protection module, and an output overvoltage protection module. An input of the input undervoltage protection module and the input overvoltage protection module are coupled to a power input end Vin of an LED lightbar, an input of the output overvoltage protection module is coupled to a power output end Vout of the LED lightbar, and all output ends of the input undervoltage protection module, the input overvoltage protection module, and the output overvoltage protection module are coupled to a protection pin OVP of a driver IC. A typical driver IC generally comprises a protection pin OVP. In generally, when a voltage of the OVP exceeds one voltage V1, the driver IC stops operating, when the voltage of the OVP is lower than one voltage V2, the VOP enters a short circuit protection, the driver IC stops operating, namely the driver IC normally operates when the voltage of the OVP of the driver IC is between V1 and V2, and a voltage range of V1-V2 is a preset voltage range of the present disclosure. The OVP is also used as the short circuit protection (SCP) generally. A specific protection value can be obtained by calculating protection voltage of a resistor, a Zener diode, and the OVP of the driver IC.

Figure 2:
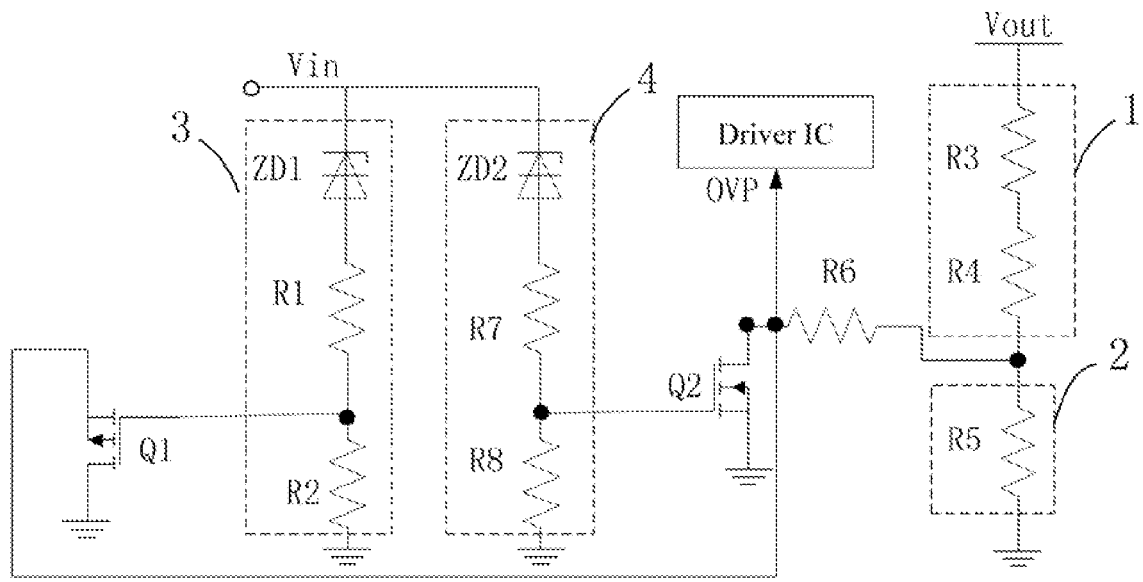
FIG. 2 is a schematic diagram of an example of the present disclosure.

FIG. 2 shows a specific circuit structure of each of the modules.

The input undervoltage protection module comprises a first controllable switch Q1, and an undervoltage control unit 3 coupled to a control end of the first controllable switch Q1. The first controllable switch Q1 is connected in series between the OVP and a power grounding end of the LED backlight driving circuit. The undervoltage control unit 3 comprises a first Zener diode ZD1, a first resistor R1 and a second resistor R2 that are connected in series between the power input end of the LED lightbar and the power grounding end of the LED backlight driving circuit in sequence. The control end of the first controllable switch Q1 is coupled between the first resistor R1 and the second resistor R2, an anode of the first Zener diode ZD1 is coupled to the first resistor R1, a cathode of the Zener diode ZD1 is coupled to the power input end of the LED lightbar, and the first controllable switch Q1 is turned on at a low level.

The first Zener diode ZD1, the first resistor R1, the second resistor R2, and the first controllable switch Q1 form an input undervoltage protection circuit. When the Vin is lower than a determined value, the first controllable switch Q1 is turned on, the OVP enters into the protection mode, and the driver IC stops operating (uses the SCP protection mode). The first controllable switch Q1 is controlled by a resistor divider circuit, a voltage of the control end of the first controllable switch Q1 is a voltage of the second resistor R2, and the voltage of the second resistor R2 changes linearly with an input voltage. When the input voltage is reduced, the voltage of the second resistor R2 is reduced. When the voltage is lower than a threshold of the first controllable switch Q1, the first controllable switch Q1 is turned on, and the OVP is grounded. Thus, the driver IC enters into the protection mode. The resistor divider has a simple circuit structure and low resistor cost, which reduces design and production cost. The first Zener diode ZD1 can prevent the input voltage ground from being short circuited when the first resistor R1 and the second resistor R2 are short-circuited.

The output overvoltage protection module comprises a first divider unit 1 and a second divider unit 2 that are connected in series between the power output end of the LED lightbar and the power grounding end of the LED backlight driving circuit, and the OVP is coupled between the first divider unit 1 and the second divider unit 2. The first divider unit 1 comprises a third resistor R3 and a fourth resistor R4 that are connected in series, and the second divider unit 2 comprises a fifth resistor R5. A sixth resistor R6 is connected in series between the OVP and the first divider unit 1 and the second divider unit 2.

The output overvoltage protection module also uses the resistor divider circuit, and the voltage of the OVP is equal to a voltage of the fifth resistor R5. When the voltage of the power output end of the LED lightbar is increased, the voltage of the fifth resistor R5 is increased. When the output voltage of the OVP is greater than a determined value, the driver IC enters into the protection mode and stops operating. The sixth resistor R6 can limit a current flowing through the OVP. In accordance with Ohm's law, when resistance is a determined value, voltage increases, which makes current increases. Therefore, when the output voltage of the LED lightbar is increased, the current flowing through the OVP is increased, which may damage the driver IC. However, because the sixth resistor R6 is connected in series, most energy is consumed by heat of the resistor. Thus, the current flowing into the driver IC is reduced to protect the driver IC from being damaged from high current.

An input overvoltage protection module is coupled between the power input end of the LED lightbar and the OVP. The input overvoltage protection module outputs a first control voltage that exceeds a preset voltage range to the OVP when the power input end of the LED lightbar is in the overvoltage state. The input overvoltage protection module comprises a second controllable switch Q2, and an overvoltage control unit coupled to a control end of the second controllable switch Q2. The second controllable switch Q2 is connected in series between the OVP and the power grounding end of the LED backlight driving circuit. When the power input end of the LED lightbar is in the overvoltage state, the overvoltage control unit 4 outputs a third control signal to drive the second controllable switch Q2 to turn on. The overvoltage control unit comprises a second Zener diode ZD2, a seventh resistor R7 and an eighth resistor R8 that are connected in series between the power input end of the LED lightbar and the power grounding end of the LED backlight driving circuit in sequence. The control end of the second controllable switch Q2 is coupled between the seventh resistor R7 and the eighth resistor R8, and the second controllable switch Q2 is turned on at a high level. The anode of the second Zener diode ZD2 is coupled to the seventh resistor R7, and the cathode of the second Zener diode ZD2 is coupled to the power input end of the LED lightbar.

The second Zener diode ZD2, the seventh resistor R7, the eighth resistor R8, and the second controllable switch Q2 form an input undervoltage protection circuit. When the Vin is greater than determined value, the second controllable switch Q2 is turned on, the OVP enters into protection mode, and the driver IC stops operating (use the SCP protection mode). The input overvoltage protection module uses a circuit structure similar to a circuit structure of the input undervoltage protection module, and is different from the input undervoltage protection module in that: the second controllable switch Q2 of the input overvoltage protection module is turned on at a high level, and the first controllable switch Q1 of the input undervoltage protection module is turned on at a low level.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

The invention claimed is:

1. A light emitting diode (LED) backlight driving circuit, comprising:
an LED lightbar; and
a driver integrated circuit (IC) coupled to the LED lightbar, wherein the driver IC is configured with a protection pin that controls the driver IC to enter a protection mode when a voltage of the protection pin exceeds a preset voltage range, and wherein an input undervoltage protection module is coupled between a power input end of the LED lightbar and the protection pin; an output overvoltage protection module is coupled between a power output end of the LED lightbar and the protection pin;
wherein the input undervoltage protection module comprises a first controllable switch, and an undervoltage control unit coupled to a control end of the first controllable switch; the first controllable switch is connected in series between the protection pin and a power grounding end of the LED backlight driving circuit; the undervoltage control unit comprises a first resistor and a second resistor that are connected in series between the power input end of the LED lightbar and the power grounding end of the LED backlight driving circuit in sequence, the control end of the first controllable switch is coupled between the first resistor and the second resistor, and the first controllable switch is turned on at a low level; a first Zener diode is connected in series between the power input end of the LED lightbar and the first resistor, an anode of the first Zener diode is coupled to the first resistor, and a cathode of the first Zener diode is coupled to the power input end of the LED lightbar;
wherein the output overvoltage protection module comprises a first divider unit and a second divider unit that are connected in series between the power output end of the LED lightbar and the power grounding end of the LED backlight driving circuit, and the protection pin is coupled between the first divider unit and the second divider unit; the first divider unit comprises a third resistor and a fourth resistor that are connected in series, and the second divider unit comprises a fifth resistor; a sixth resistor is connected in series between the protection pin and the first divider unit and the second divider unit;

an input overvoltage protection module coupled between the power input end of the LED lightbar and the protection pin; the input overvoltage protection module comprises a second controllable switch, and an overvoltage control unit coupled to a control end of the second controllable switch; the second controllable switch is connected in series between the protection pin and the power grounding end of the LED backlight driving circuit; the overvoltage control unit comprises a second Zener diode, a seventh resistor and an eighth resistor that are connected in series between the power input end of the LED lightbar and the power grounding end of the LED backlight driving circuit in sequence, the control end of the second controllable switch is coupled between the seventh resistor and the eighth resistor, and the second controllable switch is turn on at the high level; an anode of the second Zener diode is coupled to the seventh resistor, and a cathode of the second Zener diode is coupled to the power input end of the LED lightbar.

2. A light emitting diode (LED) backlight driving circuit, comprising:

an LED lightbar; and a driver integrated circuit (IC) coupled to the LED lightbar, wherein the driver IC is configured with a protection pin that controls the driver IC to enter a protection mode when a voltage of the protection pin exceeds a preset voltage range, and wherein an input undervoltage protection module is coupled between a power input end of the LED lightbar and the protection pin; an output overvoltage protection module is coupled between a power output end of the LED lightbar and the protection pin;

wherein the input undervoltage protection module outputs a first control voltage that exceeds the preset voltage range to the protection pin when the power input end of the LED lightbar is in a undervoltage state; the output overvoltage protection module outputs a second control voltage that exceeds the preset voltage range to the protection pin when the power output end of the LED lightbar is in a overvoltage state, wherein the input undervoltage protection module comprises a first controllable switch, and an undervoltage control unit coupled to a control end of the first controllable switch; the first controllable switch is connected in series between the protection pin and a power grounding end of the LED backlight driving circuit;

when the power input end of the LED lightbar is in the undervoltage state, the undervoltage control unit drives the first controllable switch to turn on, and a voltage of the power grounding end is connected to the protection pin by the first controllable switch; the first control voltage is the voltage of the power grounding end, wherein the undervoltage control unit comprises a first resistor and a second resistor that connected are in series between the power input end of the LED lightbar and the power grounding end of the LED backlight driving circuit in sequence, the control end of the first controllable switch is coupled between the first resistor and the second resistor, and the first controllable switch is turned on at a low level, wherein a first Zener diode is connected in series between the power input end of the LED lightbar and the first resistor, an anode of the first Zener diode is coupled to the first resistor, and a cathode of the first Zener diode is coupled to the power input end of the LED lightbar.

3. A light emitting diode (LED) backlight driving circuit, comprising:

an LED lightbar; and a driver integrated circuit (IC) coupled to the LED lightbar, wherein the driver IC is configured with a protection pin that controls the driver IC to enter a protection mode when a voltage of the protection pin exceeds a preset voltage range, and wherein an input undervoltage protection module is coupled between a power input end of the LED lightbar and the protection pin; an output overvoltage protection module is coupled between a power output end of the LED lightbar and the protection pin;

wherein the input undervoltage protection module outputs a first control voltage that exceeds the preset voltage range to the protection pin when the power input end of the LED lightbar is in a undervoltage state; the output overvoltage protection module outputs a second control voltage that exceeds the preset voltage range to the protection pin when the power output end of the LED lightbar is in a overvoltage state, wherein an input overvoltage protection module is coupled between the power input end of the LED lightbar and the protection pin; the input overvoltage protection module outputs a third control voltage that exceeds the preset voltage range to the protection pin when the power input end of the LED lightbar is in the overvoltage state, wherein the input overvoltage protection module comprises a first controllable switch, and an overvoltage control unit coupled to a control end of the first controllable switch; the first controllable switch is connected in series between the protection pin and a power grounding end of the LED backlight driving circuit;

when the power input end of the LED lightbar is in the overvoltage state, the overvoltage control unit drives the first controllable switch to turn on, and the voltage of the power grounding end is connected to the protection pin by the first controllable switch; the second control voltage is the voltage of the power grounding end, wherein the overvoltage control unit comprises a first Zener diode, a first resistor and an second resistor that are connected in series between the power input end of the LED lightbar and the power grounding end of the LED backlight driving circuit in sequence, the control end of the first controllable switch is coupled between the first resistor and the second resistor, and the first controllable switch is turned on at a high level; an anode of the first Zener diode is coupled to the first resistor, and a cathode of the first Zener diode is coupled to the power input end of the LED lightbar.

* * * * *